March 20, 1956     E. F. LAPHAM, JR., ET AL     2,738,925

RATE METER

Filed Nov. 30, 1951     4 Sheets-Sheet 1

INVENTORS
EDMUND F. LAPHAM, JR.
BY    JOHN ONIA
    GENRIK S. SIRVIS
Ellsworth R. Roston
ATTORNEY INVENTORS
EDMUND F. LAPHAM, JR.
BY JOHN ONIA
GENRIK S. SIRVIS
Ellsworth R. Roston
ATTORNEY March 20, 1956  E. F. LAPHAM, JR., ET AL  2,738,925
RATE METER
Filed Nov. 30, 1951  4 Sheets-Sheet 3
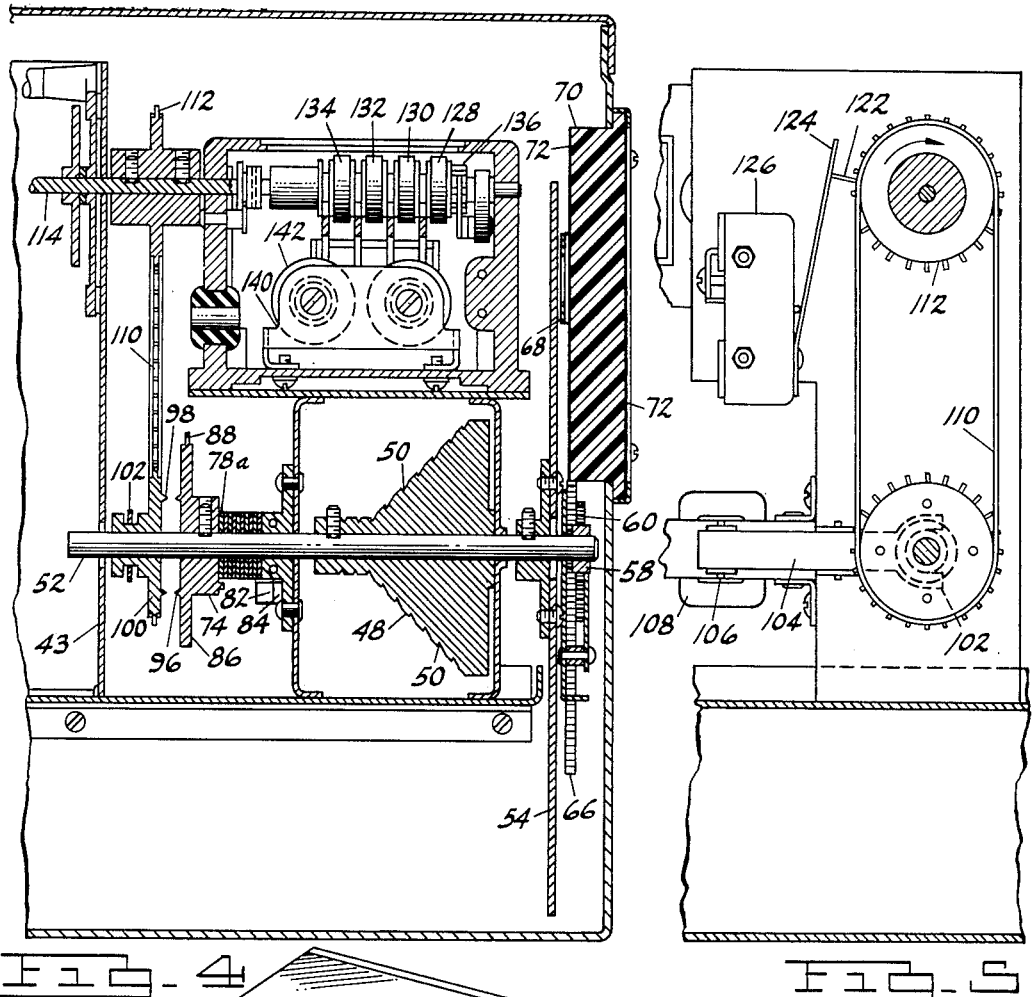
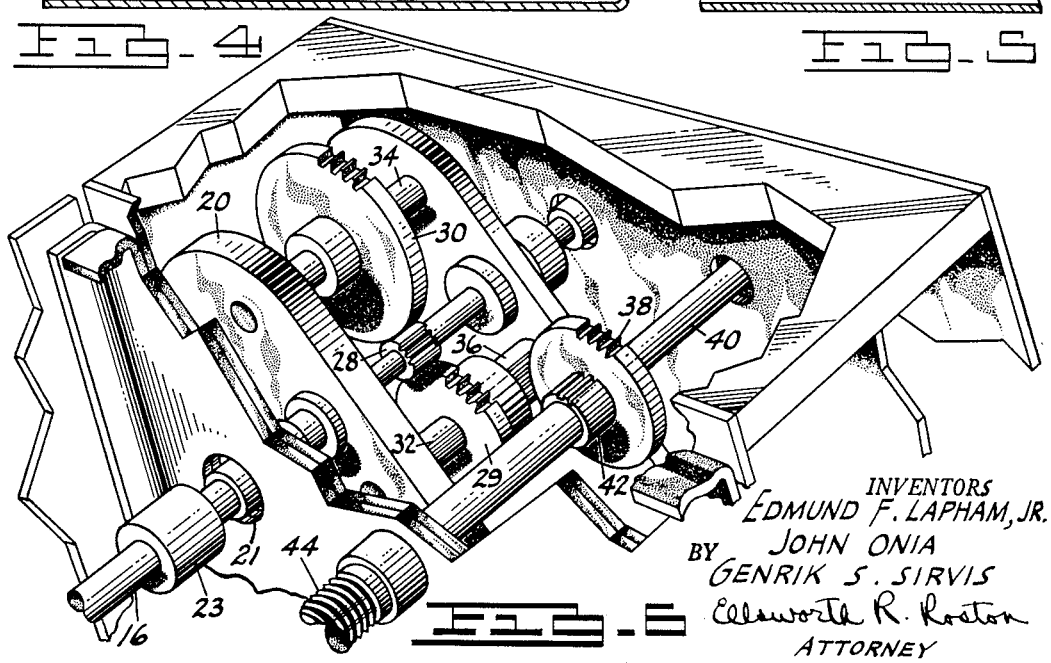
INVENTORS
EDMUND F. LAPHAM, JR.
BY JOHN ONIA
GENRIK S. SIRVIS
Ellsworth R. Roston
ATTORNEY

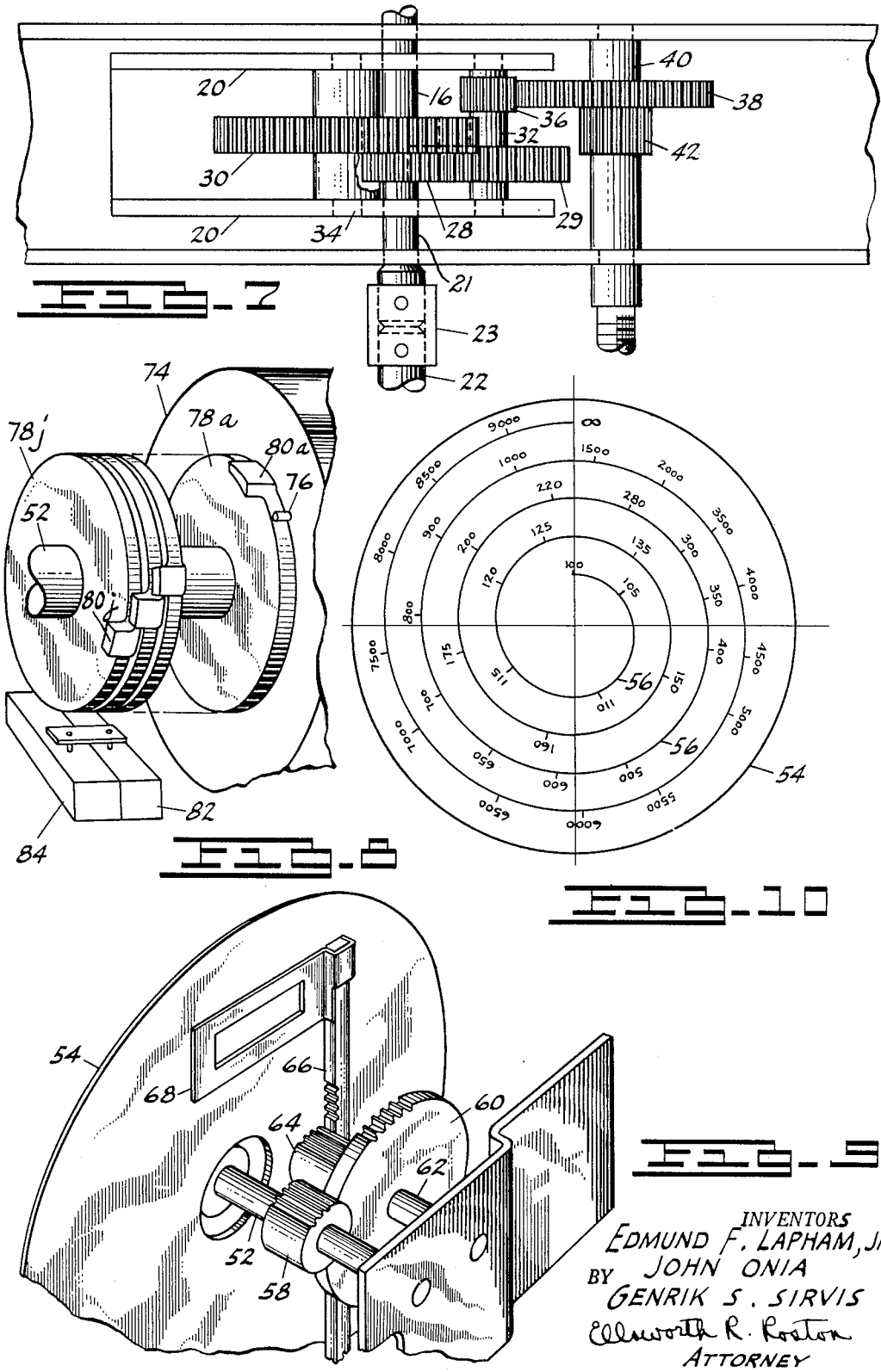

United States Patent Office 2,738,925
Patented Mar. 20, 1956

2,738,925

RATE METER

Edmund F. Lapham, Jr., Birmingham, John Onia, Berkley, and Genrik S. Sirvis, Detroit, Mich., assignors to Bendix Aviation Corporation, Detroit, Mich., a corporation of Delaware Application November 30, 1951, Serial No. 259,146

9 Claims. (Cl. 235—61)

This invention relates to apparatus for counting a predetermined number of radioactive emanations and more particularly to apparatus for determining the average rate at which a predetermined number of radioactive emanations occur.

Apparatus now exists for counting a predetermined number of radio-active emanations and for measuring the time required to make the count. The apparatus employs a Geiger tube in conjunction with electronic counters to count the emanations and a timing mechanism in synchronization with the counters to provide an indication of the time. Such apparatus does not automatically divide the radioactive count by the time measurement and thus fails to provide a determination of the rate at which the emanations occur.

Determination of the rate of radioactive emanations is often desirable since, for example, the rate provides an indication of the level at which human beings may be safely exposed to radioactivity. At such times the operator must make his own determinations of the rate, with attendant loss in time and possibility of error.

This invention provides apparatus for counting a predetermined number of radioactive emanations and for automatically determining the rate at which the emanations occur. In addition to employing a Geiger tube in conjunction with suitable electronic counters to determine the number of radioactive emanations penetrating the tube, the apparatus includes components for providing an instantaneous indication of the rate at which the predetermined number of radioactive emanations occur.

An object of this invention is to provide apparatus for counting a predetermined number of radioactive emanations.

Another object of this invention is to provide apparatus of the above character for automatically determining the rate at which a predetermined number of radioactive emanations occur.

A further object is to provide apparatus of the above character for synchronizing the measurement of time and the count of radioactive emanations so that an accurate and instantaneous indication of rate is obtained.

Still another object is to provide apparatus of the above character which is simple, compact, reliable and relatively inexpensive.

Other objects and advantages will be apparent from a detailed description of the invention and from the appended drawings and claims.

Figure 2:
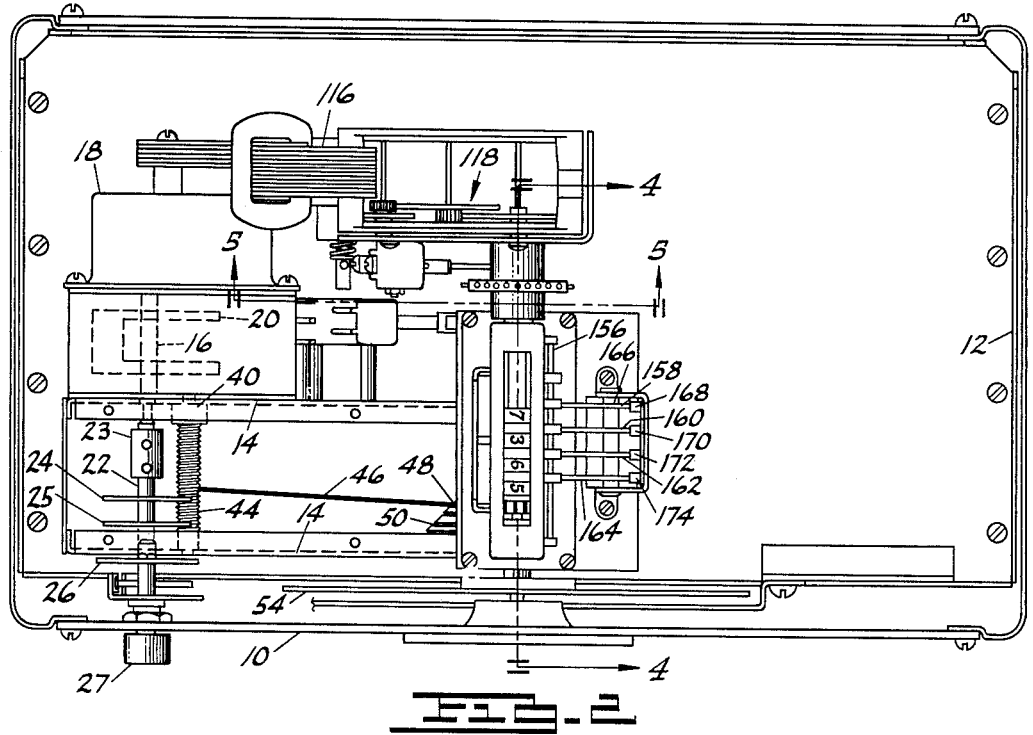
Figure 2 is a top plan view, with the top cover removed, of the embodiment shown in Figure 1.

Figures 4 and 5 are enlarged sectional views taken substantially on the lines 4—4 and 5—5, respectively, of Figure 2;

Figure 6 is an enlarged perspective view of some of the components shown in Figure 2, as seen from a position above and to the right of the components;

Figure 7 is an enlarged top plan view of the components shown in Figure 6;

Figure 8 is an enlarged fragmentary perspective view of some of the components shown in Figure 4 as seen from a position to the rear of the components;

Figure 9 is an enlarged fragmentary perspective view of other components shown in Figure 4, including a scale for instantaneously indicating the rate at which radioactive emanations occur, as seen from a position above and in front of the components; and Figure 10 is an enlarged front elevational view of the scale shown in Figures 2 and 9, particularly indicating the manner in which calibrations are provided on the scale.

In one embodiment of the invention, a front panel 10 (Figure 2) is suitably secured to a casing 12, and front and rear supporting plates 14 are provided within the casing in substantially parallel relationship to the panel. A shaft 16 (Figures 2 and 6) driven by a motor 18 (Figures 2 and 3) through a suitable gear train (not shown) is journalled in the back and front legs of a pivotable yoke 20 so that the shaft 16 will rotate freely relative to the yoke. The front leg of the yoke 20 is suitably attached to one end of a shaft 21 which is positioned in alignment with the shaft 16 and extends through an opening in the front plate 14. The opposite end of the shaft 21 is directly coupled to a shaft 22 by means of a coupling 23. The shaft 22 is carried in alignment with the shafts 21 and 16 by the coupling 23 and the front panel 10. Tri-positional rotary switches 24, 25 and 26 (Figures 1 and 2) are mounted on the shaft 22 and are positioned by the rotation of a knob 27 carried on the shaft in front of the panel 10.

Figure 1:
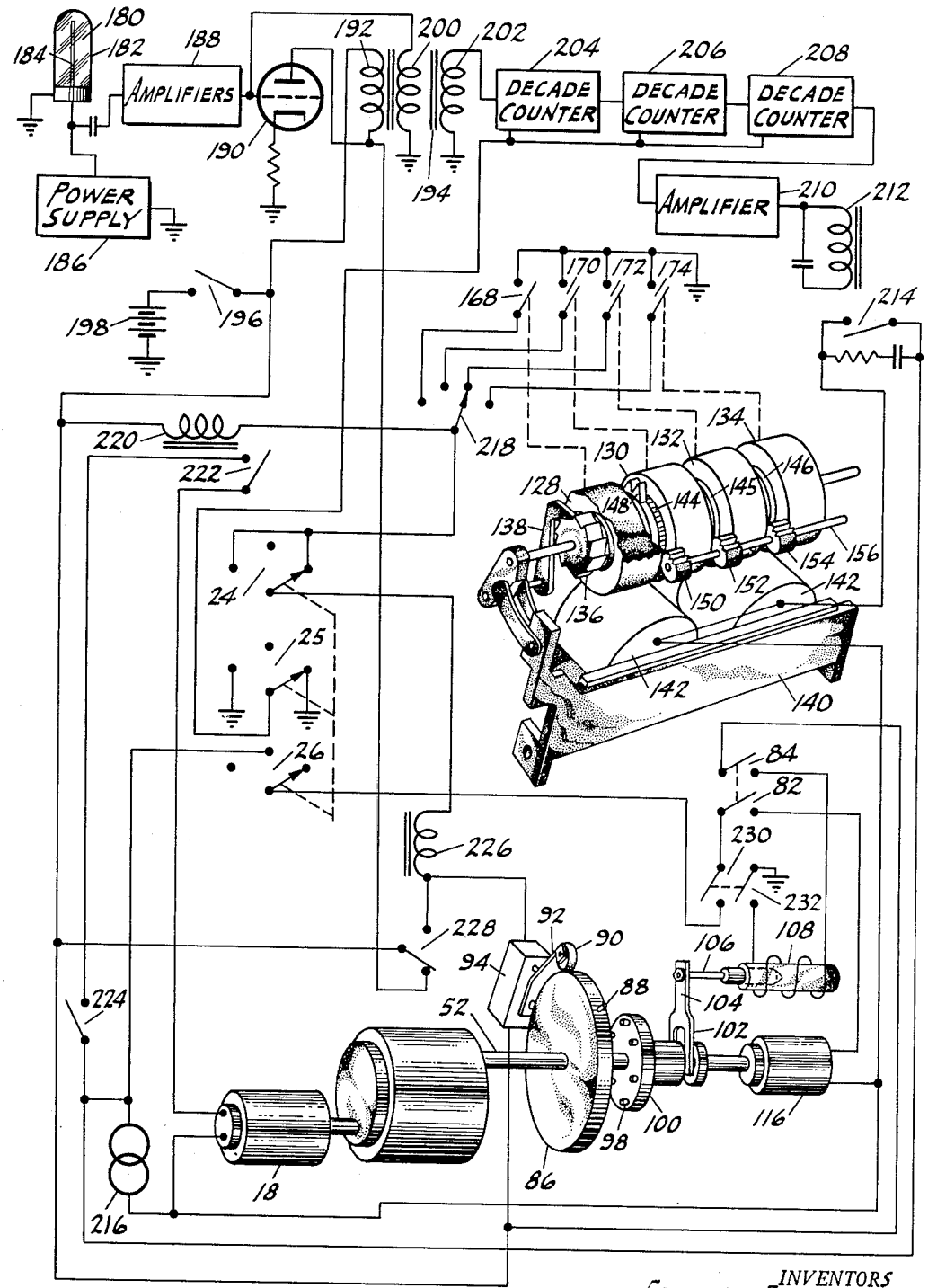
Figure 1 is a circuit diagram of the electrical features of the invention, some of the electrical components being shown in block form and some of the mechanical components necessary for an understanding of the electrical operation being shown in perspective.

A rotation of the knob 27 in a clockwise direction will move the switches 24, 25 and 26 in a clockwise direction to make contact with their right stationary contacts as shown in Figure 1. This rotation of the knob 27 will also produce a pivotal movement of the yoke 20 in a clockwise direction because of the direct coupling between the shafts 22 and 21. Similarly, a counter-clockwise rotation of the knob 27 will move the switches 24, 25 and 26 in a counter-clockwise direction to make contact with their left stationary contacts and will produce a pivotal movement of the yoke 20 in a counter-clockwise direction.

A pinion gear 28 (Figures 6 and 7) is mounted on the shaft 16 between the legs of the yoke 20 and is in mesh with a pair of gears 29 and 30 which are carried by shafts 32 and 34, respectively, journalled in the yoke 20. The shaft 32 also carries a gear 36 which is adapted to mesh with a gear 38 on a shaft 40 journalled in the plates 14, when the yoke 20 is pivoted in a counter-clockwise direction upon a rotation of the switches 24, 25 and 26 in that direction. This causes the worm gear 44 to be driven by the shaft 16 through a gear train including the gears 28, 29, 36 and 38.

When the yoke 20 is pivoted in a clockwise direction by the rotation of the switches in a clockwise direction, the gear 36 moves out of mesh with the gear 38 and the gear 30 pivots into meshing engagement with a gear 42 which is also mounted on the shaft 40. This causes the worm gear 44 to be driven by the shaft 16 through a gear train including the gears 28, 30 and 42. During the rotation of the shaft 16, the shaft 40 will rotate ten times faster when the gear 30 is in mesh with the gear 42 than when the gear 36 is in mesh with the gear 38 because of the difference in gear ratios.

The shaft 40 is threaded to form a worm gear 44 (Figure 2). A wire 46 is attached at one end to the worm gear 44 and at the other end to a cone 48 (Figures 2 and 4) spirally grooved as at 50. The wire 46 is wound on the spiral groove 50 when the radioactive count is begun and becomes wound on the worm gear 44 as the count continues.

The cone 48 is mounted on a shaft 52 journalled in the brackets 14. The shaft carries a disc 54 (Figures 4, 9 and 10) having on its front face a spiral scale 56 calibrated in units of radioactivity per unit of time. The scale is provided with a calibration of infinity at its outer extremity and with calibrations of decreasing value as the distance between the center of the spiral and the calibration decreases.

In addition to carrying the disc 54, the shaft 52 carries a pinion gear 58 (Figure 9) which meshes with a gear 60 (Figures 4 and 9) on a shaft 62. A pinion gear 64 is also mounted on the shaft 62 in mesh with a rack gear 66. The rack gear carries a flag 68 which is positioned between the disc 54 and a transparent window 70 (Figure 4) in the front panel 10, the window being made from a suitable material such as a polymer of methyl methacrylate. The flag 68 has a central opening and moves vertically as the cone 48 and the disc 54 rotate, so as to bracket the scale position at which a reading is to be made. A pair of hair line pointers 72 are centrally provided in the front and back of the window 70 to properly align the eyes of the reader so that he can make an accurate reading of the scale 56.

A sleeve 74 (Figure 4) having a peripheral lug 76 (Figure 8) is rigidly mounted on the shaft 52, and a plurality of washers, 78a, 78b, 78c, etc. (Figures 4 and 8) having lugs 80a, 80b, 80c, etc., are loosely mounted on the shaft between the collar 74 and the cone 48. The lug 76 is adapted to engage the lug 80a after a complete revolution of the sleeve 74 and to thereafter turn the washer 78a with the sleeve. After a complete revolution of the washer 78a, the lug 80a engages the lug 80b and thereafter rotates the washer 78b. In this way each washer engages the lug on the next washer after a complete revolution and subsequently drives the next washer with it. The opening and closing of microswitches 82 and 84 are controlled by the movement of the sleeve 74 and washers 78 relative to the movable contacts of the switches, as will be disclosed in detail hereafter.

The sleeve 74 is flanged as at 86 to form a cam and an ear 88 is provided on the annular surface of the cam 86 to contact a cam follower 90 (Figures 1 and 3) pressed against the cam periphery by a leaf spring 92, which forms a part of a microswitch 94. A plurality of lobes 96 (Figure 4) on one face of the cam 86 are adapted to engage similar lobes 98 (Figures 1 and 4) on a clutch plate 100 loosely mounted on the shaft 52, when the clutch plate is moved to the right in Figure 4. The clutch plate 100 is axially positioned by a yoke 102 (Figures 1, 4 and 5) having an arm 104 pivotable at its outer end by an armature 106, the armature being actuated by a solenoid 108.

The annular surface of the clutch plate 100 is provided with a plurality of sprockets which engage a chain 110 (Figures 3, 4 and 5) driven by a sprocket wheel 112 mounted on a shaft 114. The shaft 114 is in turn adapted to be driven by a motor 116 (Figures 2 and 3) through a gear train, generally indicated at 118 in Figure 2. A collar 120 (Figure 3) integral with the sprocket wheel 112 carries a lug 122 (Figures 3 and 5) which presses for an instant during each revolution against a leaf spring 124 forming part of a microswitch 126.

In addition to carrying the sprocket wheel 112, the shaft 114 loosely carries a plurality of cylinders 128, 130, 132 and 134 (Figures 1 and 4). Each cylinder has integers from "0" to "9" printed in equally spaced relationship on its annular periphery. A ratchet wheel 136 (Figure 1) is mounted on the shaft 114 in fixed engagement with the cylinder 128 and is adapted to be rotated by a pawl 138 operated by a pivotable armature plate 140. The armature plate is actuated by a pair of solenoids 142 positioned below the cylinders and connected in series to each other.

Gears 144, 145 and 146 (Figure 1) are loosely mounted on the shaft in free association with the cylinders 130, 132 and 134, respectively. The gears 144, 145 and 146 have ten teeth corresponding to the number of integers printed on the associated cylinders and are on the same side relative to their associated cylinders as the positioning of ratchet wheel 136 relative to the cylinder 128.

Pawls 148 (Figures 1 and 3) extend respectively from the sides of the cylinders 128, 130, 132 and 134 opposite the gears 144, 145 and 146 and the ratchet wheel 136. The pawls associated with the cylinders 128, 130 and 132 are adapted to engage pinion gears 150, 152 and 154 (Figure 1), respectively, loosely mounted on a shaft 156 (Figures 1 and 2). Each of the pinion gears 150, 152 and 154 is in turn in mesh with one of the gears 144, 145 and 146, respectiyely, and produces a revolution of its associaterd gear through one tooth every time that the pinion gear is engaged by its associated pawl 148.

Bell crank levers 158, 160, 162 and 164 (Figures 2 and 3) pivotable on a shaft 166 are associated with the cylinders 128, 130, 132 and 134, respectively. One arm of each bell crank lever is engaged by the pawl 148 on its associated cylinder when the cylinder is rotated through a predetermined angle corresponding to a particular integer on the cylinder. The other arm of each bell crank lever presses against the movable contact of a switch, the switches 168, 170, 172 and 174 (Figures 1, 2 and 3) being associated with the levers 158, 160, 162 and 164, respectively. The individual fingers of a leaf spring 176 press against the bell crank levers to maintain the switches closed when the levers are not pivoted by their associated pawls.

The motors 18 and 116, the rotary switches 24, 25 and 26, the microswitches 82, 84, 94 and 126, and the switches 168, 170, 172 and 174 are included in the electrical circuit shown in Figure 1. The circuit also includes a Geiger tube 180 which is filled with a suitable gas, such as argon, and which has a metallic casing 182 and a wire 184 axially disposed within the casing in insulated relationship to the casing. A relatively high direct voltage is applied to the wire 184 from a suitable power supply 186.

The output from the Geiger tube 180 is introduced through a plurality of amplifier stages 188 to the grid of a tube 190 in a blocking oscillator stage. The cathode of the tube is connected through a suitable resistance to ground and the plate is connected to one terminal of a primary winding 192 forming part of a transformer 194. The other terminal of the winding 192 is connected through a manually operated switch 196 to the positive terminal of a suitable direct power supply, such as a battery 198 having its negative terminal grounded.

One secondary winding 200 of the transformer 194 is connected between the grid of the tube 190 and ground, and another secondary winding 202 is connected between ground and a decade counter 204. A pair of decade counters 206 and 208 are provided in cascade arrangement with the counter 204. The decade counter 208 is connected through an amplifier stage 210 to a solenoid 212 operative upon a switch 214. The switch 214 is connected in series with the solenoids 142 and an alternating power supply 216. Because of the inertia of the armature plate 140, the plate is actuated only once during each continuous flow of alternating current through the solenoids 142.

As previously disclosed, the switches 168, 170, 172 and 174 are associated with the cylinders 128, 130, 132 and 134, respectively. The stationary contacts of the switches are grounded and the movable contacts are connected to the different stationary contacts of a rotary switch 218 also shown in Figure 3. The movable contact of the switch 218 is connected to one side of a solenoid 220 (Figure 1), the other side of which is connected to the movable contact of the switch 196. The solenoid 220 operates upon a switch 222 connected in series with the motor 18, the alternating power supply 216 and a manually operated master switch 224.

The movable contact of the switch 218 is also connected to the two extreme stationary contacts of the rotary switch 24, the movable contact of which is connected to a solenoid 226. The solenoid 226 is in turn connected to one terminal of the microswitch 94 having its other terminal connected to the movable contact of the switch 196 and to the movable contact of a double-throw switch 228 which is adapted to be actuated when the solenoid 226 becomes energized. Connections are made from one stationary contact of the switch 228 to the plate of the tube 190 and from the other stationary contact to the solenoid 226.

The movable contact of the rotary switch 25 is connected to suitable terminals of the decade counters 204, 206 and 208, and the extreme stationary contacts of the switch 25 are grounded. Connections are made from the intermediate stationary contact of the rotary switch 26 to the alternating power supply 216 and from the movable contact of the switch 26 to the stationary contact of a switch 230. The intermediate stationary contacts of the switches 24 and 25 and the extreme stationary contacts of the switch 26 are floating.

The movable contact of the switch 230 is connected to the movable contact of the microswitch 82, the stationary contact of which is connected to one terminal of the motor 116 having its other terminal connected to the alternating power source 216. A switch 232 ganged to the switch 230 has its movable contact grounded and its stationary contact connected to one terminal of the solenoid 108. The other terminal of the solenoid 108 is connected to the stationary contact of the microswitch 84 having its movable contact connected to the movable contact of the switch 196.

With the manually operated switches 196 and 224 closed, the solenoid 220 is energized through a circuit which includes the battery 198, the switch 196, the solenoid 220, the switch 218 and one of the switches 168, 170, 172 and 174, depending upon the position of the movable contact of the switch 218. The switch 222 closes when the solenoid 220 is energized and provides a continuous circuit through the power supply 216, the switch 224, the switch 222, and the motor 18. The motor 18 then drives the shaft 16 (Figure 2) in a direction to wind the wire 46 on the worm gear 44, thereby unwinding the wire from the cone 48.

Figure 3:
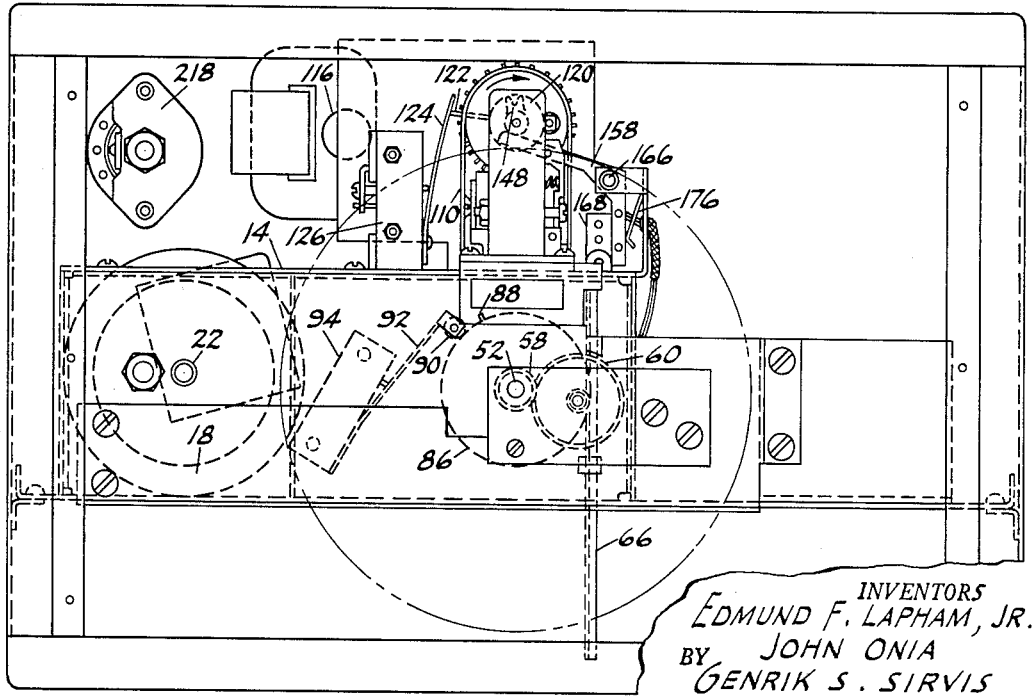
Figure 3 is a front elevational view, with the front panel removed, of the embodiment shown in Figures 1 and 2.

The cam 86 (Figure 4) and the disc 54 also rotate with the cone 48, and, after a predetermined angular rotation, the ear 88 on the cam pivots the cam follower 90 in a counterclockwise direction in Figure 3 so that the switch 94 closes. A continuous circuit is then established which includes the battery 198, the switch 196, the switch 94, the solenoid 226, the switch 24, the switch 218 and one of the switches 168, 170, 172 and 174, provided, of course, that the movable contacts of the switches 24, 25 and 26 are in their extreme left or right positions in Figure 1.

Upon the establishment of a continuous circuit through it, the solenoid 226 becomes energized and attracts the movable contact of the switch 228 to the upper stationary contact in Figure 1. Attracting the movable contact of the switch 228 upwardly produces a circuit for maintaining the solenoid 226 energized even after the switch 94 opens because of the continued rotation of the cam 86. The attraction of the movable contact of the switch 228 to its upper stationary contact also breaks the short circuit which the switch maintains across the primary winding 192 when its movable contact engages its lower stationary contact. As will be subsequently disclosed in detail, eliminating the short circuit across the winding 192 causes the count of radioactive emanations penetrating the Geiger tube 180 to commence.

Each radioactive emanation which penetrates the tube 180 produces an ionization of the gas molecules in the tube. The positive ions are attracted to the casing 182 and the negative ions to the wire 184 so as to produce a pulse of current through the tube. The current pulse is amplified and introduced to a blocking oscillator which includes the tube 190 and transformer 194. After the shape of the pulses has been sharpened by the blocking oscillator, the pulses are introduced to the decade counters 204, 206 and 208. Since each counter produces an output pulse for every ten input pulses, one output pulse is provided by the counter 208 for every thousand pulses introduced to the counter 204. Because of the connections between the counters and the switch 25, the counters 204, 206 and 208 operate only when the movable contact of the switch engages the extreme left or right stationary contacts in Figure 1 to produce a ground through the switch.

Each pulse from the counter 208 energizes the solenoid 212 and causes the switch 214 to close. The solenoids 142 are then energized by the alternating current which flows through a circuit including the power supply 216, the solenoids and the switch 214, and the armature plate 140 is pivotably attracted towards the solenoids so as to turn the ratchet wheel 138 and the cylinder 128 through one-tenth of a complet revolution. After the cylinder 128 has advanced ten times in such manner, the pawl 148 on the cylinder engages the pinion 150 and turns it through an arc equivalent to one tooth. The pinion 150 in turn rotates the gear 144 and the cylinder 130 through one-tenth of a complete revolution. Thus, the readings on the cylinders 128, 130, 132 and 134, when multiplied by one thousand, provide at all times a reliable indication of the number of radioactive emanations which have penetrated the Geiger tube 180 after the count of radioactive emanations has begun.

As the cylinders 128, 130, 132 and 134 rotate, the pawls 148 associated with the different cylinders engage the bell crank levers 158, 160, 162 and 164, respectively, and pivot the levers in a direction to open the switches 168, 170, 172 and 174, respectively. Each lever is positioned so as to open its associated switch at a predetermined count, generally a round number, of radioactive emanations. For example, the switches 168, 170, 172 and 154 may open when one thousand, ten thousand, one hundred thousand and one million emanations have been respectively counted.

Since each stationary contact of the switch 218 is connected to a different one of the switches 168, 170, 172 and 174, the position of the movable contact of the switch 218 determines the count at which the solenoid 220 is de-energized. Thus, if the movable contact of the switch 218 engages the right stationary contact, the continuous circuit through the solenoid 220 will be interrupted when the switch 174 opens upon a count of one million radioactive emanations. This causes the switch 222 to open and the circuit to the motor 18 to be interrupted. At the same time, the continuous circuit through the solenoid 226 is interrupted because of the opening of the switch 174, and the movable contact of the switch 228 is released from its upper stationary contact to its lower stationary contact in Figure 1. The release of the switch 228 produces a short circuit of the primary winding 192 by the switch and prevents any further count of radioactive emanations from occurring.

As previously disclosed, the motor 18 rotates the disc 54 during the count of radioactive emanations. The pinion gear 64 (Figure 9) rotates with the disc 54 and drives the rack gear 66 and the flag 68 downwardly so that the flag always brackets a small portion of the scale 56. The reading of the scale portion within the flag 68 provides an automatic and instantaneous indication of the rate at which the radioactive emanations have been counted. The reading is instantaneous since the scale 56 is calibrated, as indicated in Figure 10, in accordance with the angle between the periphery of the cone and the axis of the cone. The scale is also calibrated in accordance with the equation:

$$R = \frac{N}{T}$$

where

N = the number of radioactive emanations counted,
T = the time required to count N number of radioactive emanations, and
R = the average rate of radioactive emanations during the time T.

The calibration of the scale 56 is made along a spiral curve as shown in Figure 10, from a rate of infinite value at the starting position on the scale to a rate of relatively low value near the center of the spiral. By using a cone having a relatively large angle between the periphery of the cone and the axis of the cone, relatively clear indications are provided over the complete range of measurement. The reading on the scale 56 must be decimally multiplied by a factor dependent upon the number of radioactive emanations which have been counted. For example, if 10,000 emanations are counted in 120 seconds, the rate is approximately 83.3 units per second, whereas the rate is approximately 8330 units per second if 1,000,000 emanations are counted in 120 seconds. Since the positioning of the movable contact of the switch 218 determines the number of radioactive emanations that are counted, the multiplying factor can be indicated directly on the front panel 10 for each position of the switch.

The position of the decimal in the reading on the scale 56 is also determined by the setting of the switches 24, 25 and 26. If the switches are manually rotated counterclockwise to their extreme left positions, as seen in Figure 1, the motor 18 drives the worm gear 44 through a gear train including the gear 28 (Figures 6 and 7), the gear 29, the gear 36, and the gear 38. This causes the worm gear 44 to rotate at a speed which gives a direct reading on the scale 56 after the scale has been multiplied by a factor corresponding to the positioning of the switch 218 in Figure 1. Upon the clockwise rotation of the switches 24, 25 and 26 to their extreme right positions, the motor drives the worm gear 44 through a gear train including the gear 28, the gear 30 and the gear 42. Since the worm gear 44 then rotates at a speed which is approximately ten times faster than its speed with the switches 24, 25 and 26 in their extreme left position, the reading of the scale 56 must be multiplied by a factor of 10 in addition to the factor determined by the setting of the switch 218.

At the same time that the motor 18 is rotating the cone 48 (Figure 4) on the shaft 52 during the count of radioactive emanations, the motor is also rotating the sleeve 74 (Figures 4 and 8) and the washers 78. Upon the instantaneous operation of the motor, the sleeve 74 rotates in a direction to relieve the pressure of the lugs 76 and 80 against the normally open microswitches 82 and 84 and the microswitches close. Continuing operation of the motor 18 causes the lug 76 to engage the lug 80a on the washer 78a after its first revolution so as to carry the washer 78a with it. In this way, each of the washers 78b, 78c, etc. are engaged upon subsequent revolutions of the shaft 52 and are thereafter rotated with the shaft.

After the rate has been determined, the movable contacts of the switches 24, 25 and 26 are rotated into engagement with their middle stationary contacts and the switches 230 and 232 are closed. By closing the switch 232, a continuous circuit is established through the battery 198, the switch 196, the switch 84, the solenoid 103 and the switch 232. The solenoid 103 then becomes energized and attracts the armature 106 in a direction to pivot the clutch plate 100 to the left in Figure 1. The resultant engagement between the lobes on the clutch plate 100 and the cam 86 couples the shaft 52 to the rewind motor 116, which rotates the shaft in an opposite direction to that produced by the motor 18.

The motor 116 is energized at the same time as the solenoid 103 because of the current which flows through a continuous circuit including the alternating power source 216, the switch 26, the switch 230, the microswitch 82 and the motor. The operation of the motor 116 continues until the sleeve 74 has rewound the washers 78 to their original position, at which time the cumulative pressure of the sleeve and washers upon the microswitches 82 and 84 causes them to open. The angular rotation of the sleeve 74 and the washers 78 required to open the microswitch 82 corresponds to the angular rotation of the sleeve and washers during the count of radioactive emanations.

During the rewind operation, the motor 116 also drives the cylinders 128, 130, 132 and 134 to their zero positions. The pawl 148 on each cylinder engages the pinion associated with the next cylinder within a complete revolution and thereafter locks the next cylinder for rotation with it. In this way, the "0" integers on all of the cylinders are lined up very quickly and are maintained in alignment.

The apparatus disclosed above automatically provides an indication of the rate of radioactive emanations at the same time that it counts the emanations. Although it performs the additional service of indicating the rate it does not occupy any more space than the counting apparatus now in use, since the rate is indicated on the spiral scale 56 as a result of the rotation of the disc 54.

By beginning the measurements at the outer perimeter of the scale where the scale is expanded, accurate readings for high rates of count are possible. An expanded scale is desirable at the beginning of the count because of the rapid changes in the average rate which occur during the first units of time. For example, if 10,000 emanations are counted in five seconds, the rate is 2,000 emanations per second. The value decreases to 1667 emanations per second if the count is made in six seconds. If, however, the count is completed at one time in fifteen seconds and at another time in sixteen seconds, the rate only changes from 667 to 625 emanations per second.

Unlike other counting apparatus, the apparatus disclosed above is not limited as to the number of radioactive emanations it can count. By the addition of components associated with the cylinders and by the proper positioning of the pawls 148 on the cylinders, an unlimited count of radioactive emanations can be obtained. Relatively large counts of radioactive emanations are desirable, especially where the rate of count is high, because of the increased accuracy which results.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Apparatus for determining the rate at which a predetermined number of radioactive emanations occur, including, a cone spirally grooved along its annular periphery, a disc adapted to be driven with the cone, there being on the disc a spiral scale calibrated to indicate different rates for the occurrence of the radioactive emanations, a wire secured to the cone at one end and adapted to be unwound from the spiral groove in the cone as the radioactive emanations are counted, a rotary member, there being a spiral groove in the rotary member for receiving the wire as the radioactive emanations are counted, a motor for driving the rotary member, means for counting the radioactive emanations, means for initiating the count of radioactive emanations at a position on the disc corresponding to the beginning of the spiral scale, and means associated with the motor and the counting means and operative upon the completion of the count to stop the motor and simultaneously to discontinue the count.

2. Apparatus for determining the rate at which a predetermined number of radioactive emanations occur, including, means for counting the radioactive emanations, a motor, a wire, means adapted to be driven by the motor and to receive the wire during its operation by the motor, means adapted in its inoperative position to hold the wire in a predetermined pattern and to feed the wire to the driven means during the operation of the driven means, a disc adapted to be driven by the feeding means, a scale on the disc calibrated to indicate the ratio between a count of radioactive emanations and the time required to obtain the count, means for synchronizing the count of radioactive emanations and the rotation of the disc, and means associated with the counting means and the motor operative to discontinue the count of radioactive emanations and to simultaneously stop the operation of the disc upon the completion of the count.

3. Apparatus for determining the rate at which a plurality of radioactive emanations occur, including, an annular member spirally grooved along its periphery, a disc adapted to be driven by the annular member, there being on the disc a spiral scale calibrated to indicate different rates for the occurrence of the radioactive emanations, a wire secured to the annular member at one end and adapted to be unwound from the spiral groove in the member as the radioactive emanations are counted, a rotary member, there being a spiral groove in the rotary member for receiving the wire as the radioactive emanations are counted, a motor for driving the rotary member during the time that the radioactive emanations are being counted, an indicator adapted to be driven by the motor and to be movably positioned with respect to the disc to show the reading to be made on the scale at any instant, a circuit for counting the radioactive emanations, switching means associated with the disc and connected in the circuit to initiate the operation of the counting circuit at a position on the disc corresponding to an initial reading on the scale, and switching means associated with the motor and connected in the circuit to stop the motor upon the completion of the count and simultaneously to discontinue the count.

4. In apparatus for determining the rate at which a plurality of radioactive emanations occur, an annular member spirally grooved along its annular periphery, a wire wound on the annular member in the grooves in the member, a rotary member, there being a spiral groove in the rotary member for receiving the wire, a motor for driving the rotary member in a direction to wind the wire on the member during the time that radioactive emanations are being counted, a disc adapted to be driven with the annular member, and a spiral scale provided on a face of the disc and calibrated to indicate the rate of radioactivity.

5. In apparatus for determining the rate at which a plurality of radioactive emanations occur, a cone spirally grooved along its annular periphery, a wire wound on the cone in the grooves in the cone, a rotary member, there being a spiral groove in the rotary member for receiving the wire, a motor for driving the rotary member in a direction to wind the wire on the member and to rotate the cone during the time that radioactive emanations are being counted, a disc adapted to be driven with the cone, a spiral scale provided on a face of the disc and calibrated to indicate the rate of radioactivity, a pinion gear adapted to be driven with the disc, a rack gear adapted to be driven by the pinion gear in a radial direction relative to the disc, and a flag carried by the rack gear to indicate the reading to be made on the scale.

6. In apparatus for determining the rate at which a plurality of radioactive emanations occur, an annular member spirally grooved along its annular periphery, a wire wound on the annular member in the grooves in the member, a rotary member, there being a spiral groove in the rotary member for receiving the wire, a motor for driving the rotary member in a direction to wind the wire on the member and to rotate the annular member during the time that radioactive emanations are being counted, a disc adapted to be driven with the annular member, a spiral scale provided on a face of the disc and calibrated to indicate the rate of radioactivity, a flag shaped to indicate the portion of the scale to be read, and means for driving the flag in a radial direction in accordance with the rotary movements of the disc to provide a correct indication at any instant of the portion of the scale to be read.

7. Apparatus for determining the rate at which a predetermined number of radioactive emanations occur, including, a Geiger tube for producing signals upon the introduction of radioactive emanations, a circuit for counting the radioactive emanations, a first switch connected in the circuit for opening the circuit to prevent the count of radioactive emanations, a scale calibrated to indicate the rate at which the radioactive emanations occur, a motor connected in the circuit and operative upon energization to drive the scale, a second switch operative upon the movement of the scale to a position of initial reading, a solenoid connected in the circuit to be energized upon the operation of the second switch and to operate the first switch for initiating a count of radioactive emanations, and a third switch connected in the circuit and operative upon the predetermined count of radioactive emanations to stop the motor and to operate the first switch so as to prevent a further count of radioactive emanations.

8. Apparatus for determining the rate at which a predetermined number of radioactive emanations occur, including, a Geiger tube for producing signals upon the introduction of radioactive emanations, a circuit for counting the radioactive emanations, a first switch connected in the circuit for opening the circuit to prevent the count of radioactive emanations, a scale calibrated to indicate the rate at which the radioactive emanations occur, a motor for driving the scale, a circuit for controlling the operation of the motor, a second switch in the motor-control circuit, a first solenoid for controlling the operation of the second switch, a third switch operative upon the movement of the scale to a position of initial reading, a second solenoid connected in the counting circuit to be energized upon the operation of the third switch and to operate the first switch for initiating a count of radioactive emanations, and a fourth switch connected in circuitry with the first and second solenoids and operative upon the predetermined count of radioactive emanations to interrupt the continuous circuits to the solenoids so as to stop the motor and prevent a further count of radioactive emanations.

9. Apparatus for determining the rate at which a predetermined number of radioactive emanations occur, including, a Geiger tube for producing signals upon the introduction of radioactive emanations, a circuit for counting the radioactive emanations, a first switch connected in the circuit for opening the circuit to prevent the count of radioactive emanations, a wire, an annular member holding one end of the wire, there being a spiral groove in the annular member to receive the wire, a rotary member holding the other end of the wire, a motor connected in the circuit and operative upon energization to drive the rotary member in a direction to wind the wire upon the rotary member, a disc adapted to be driven with the rotary member, a spiral scale on the disc, the scale being calibrated to indicate the rate at which the radioactive emanations occur, a second switch operative upon the movement of the scale to a position of initial reading, a solenoid connected in the circuit to be energized upon the operation of the second switch and to operate the first switch for initiating a count of radioactive emanations, and a third switch connected in the circuit and operative upon the predetermined count of radioactive emanations to stop the motor and to operate the first switch so as to prevent a further count of radioactive emanations.

References Cited in the file of this patent

UNITED STATES PATENTS

| | | |
|---|---|---|
| 2,144,325 | Buchardt | Jan. 17, 1939 |
| 2,407,320 | Miller | Sept. 10, 1946 |
| 2,485,200 | Imm | Oct. 18, 1949 |
| 2,493,346 | Herzog | Jan. 3, 1950 |
| 2,499,237 | Veatch et al. | Feb. 28, 1950 |
| 2,619,600 | Hamacher | Nov. 25, 1952 |
| 2,619,601 | Zollers | Nov. 25, 1952 |
| 2,625,656 | Blackmore | Jan. 13, 1953 |

FOREIGN PATENTS

| | | |
|---|---|---|
| 646,244 | Great Britain | Nov. 15, 1950 |
| 446,542 | Great Britain | May 1, 1936 |